United States Patent Office 2,820,062
Patented Jan. 14, 1958

2,820,062

PREPARATION OF ORGANIC THIOLS

Hillis O. Folkins, Crystal Lake, Elmer L. Miller, Cary, and Adolph Kempf, Crystal Lake, Ill., assignors to The Pure Oil Company, Chicago, Ill., a corporation of Ohio No Drawing. Application August 11, 1954
Serial No. 449,256

15 Claims. (Cl. 260—609)

This invention relates to a method of producing organic thiols and is specifically directed to a composite catalyst for increasing the efficiency of the reaction between a monohydric alcohol and hydrogen sulfide to produce an organic thiol. This application is a continuation-in-part of application Serial No. 389,858, filed November 2, 1953.

Mercaptans as a class of compounds may be produced from a variety of raw materials and by means of a plurality of processes. The more adaptable of these processes involves the addition of the sulfhydryl radical to a suitable nucleus. Most commercial scale processes for the formation of relatively high molecular weight thiols involve the direct addition of hydrogen sulfide to olefinic hydrocarbons in the presence of suitable catalysts. However the mechanism of the reaction precludes its use in the preparation of methanethiol.

Although it is one of the most classic methods, having been discovered by Sabatier, and entails as simple a mechanism as the reaction between hydrogen sulfide and olefinic hydrocarbons, the dehydration of monohydric alcohols by inter-acting hydrogen sulfide therewith in the presence of a metallic oxide has never been commercially adapted to the production of thiols because of the indifferent results obtained when the process was practiced according to the prior art techniques. It has been found, however, that this reaction may be carried out efficiently and economically in the commercial production of organic thiols by suitably modifying the techniques described in the prior art.

Earlier development work in the production of methanethiol employing methanol and hydrogen sulfide as reactants was concerned primarily with manipulative techniques for improving the efficiency of the reaction. For example, it was found that by carrying out the reaction in the presence of small amounts of water, the efficiency of the reaction was considerably enhanced. This discovery is disclosed and claimed in U. S. Patent 2,685,605. In addition, the use of critical amounts of hydrogen was also found to have a beneficial effect on the conversion. This improvement is disclosed and claimed in U. S. Patent 2,647,151. The catalysts employed in this work were the metallic oxides disclosed in the prior art. Earlier investigations of this reaction, such as that reported by Kramer and Reid, J. A. C. S., 43 (880), (1921), indicated that thoria was the most effective catalyst for carrying out the reaction. Subsequent work confirmed this and produced results which evidenced that thoria was about twice as effective as zirconia, the next best metallic oxide for carrying out the reaction employing the lower molecular weight alcohols. It has now been found that other compositions may be employed as catalysts for increasing the efficiency of the reaction between alcohols and hydrogen sulfide to produce organic thiols.

Accordingly it is an object of this invention to provide a contact or solid catalyst capable of promoting the reaction between a monohydric alcohol and hydrogen sulfide to produce substantial yields of an organic thiol.

A further object of this invention is to provide a catalyst which will have directing effect on selectively catalyzing the reaction of alcohols and hydrogen sulfide to produce increased amounts of corresponding thiols by minimizing the formation of by-products of the reaction, such as thio-ethers, ethers or unsaturates.

In the preparation of thiols from hydrogen sulfide and alcohols, there are a number of competing reactions. The principal side reactions are dehydrogenation and dehydration with subsequent formation of unsaturates, aldehydes and thioladehydes and formation of ethers and thioethers. Although the use of methanol as a reactant precludes the formation of unsaturated hydrocarbons through elimination of a water molecule from methanol or hydrogen sulfide molecule from methanethiol, the production of minor amounts of products, such as dithiabutane, diethylene disulfide, trimethylene trisulfide and mercapto dimethyl thioether may obtain. Thus, in addition to increased cost of operation due to the conversion of methanol to undesired and generally useless products, the complex and heterogeneous nature of the crude reaction product requires an expensive and complicated recovery, separation and purification system as an adjunct to the reaction section of the process. However, according to this invention it has been found that in the production of organic thiols from the reaction of an alcohol and hydrogen sulfide greater selectivity in the conversion to the thiol, than has been possible through the use of the prior art catalysts, can be obtained and the foregoing problems substantially eliminated by the use of improved composite catalysts consisting essentially of activated aluminum oxides promoted by small amounts of the heat-stable metallic salts of an oxy acid of a metal selected from the group consisting of tungsten, chromium, molybdenum, uranium, vanadium, and manganese. The positive radical of these salts may be selected from a variety of cationic substituents including the alkaline earth metals, alkali metals, copper, aluminum, iron, nickel, cobalt, etc. To illustrate the instant invention, a number of catalysts were employed as contact catalysts in the reaction between methanol and hydrogen sulfide. A reaction mixture of hydrogen sulfide and methanol in a mol ratio of 2 to 1 and containing about 0.33 mol percent of water was contacted with the catalyst at a temperature of about 750° F. and at 1 atmosphere pressure in a suitable reactor. Each run was conducted using a liquid volume hourly space velocity, based on methanol, of 0.38. This liquid volume hourly space velocity is defined as the liquid volume of methanol feed used per hour per unit volume of catalyst in the reactor. The various results obtained for each catalyst are summarized in Table I.

Table I

[Operating conditions: 750° F.; atmospheric pressure; H$_2$S/methanol (mol ratio)=2; LHVSV-0.38.]

| Run | Catalyst | Percent conversion | Mercaptan yield (mol percent) | Percent selectivity |
|---|---|---|---|---|
| 1 | Al$_2$O$_3$-K$_2$WO$_4$ (14 wt. percent) | 84.7 | 82.6 | 97.6 |
| 2 | Al$_2$O$_3$-K$_2$WO$_4$ (8 wt. percent) | 92.7 | 90.7 | 97.9 |
| 3 | Al$_2$O$_3$-K$_2$WO$_4$ (8 wt. percent) | 94.1 | 92.2 | 98.0 |
| 4 | Al$_2$O$_3$-K$_2$WO$_4$ (4 wt. percent) | 91.2 | 86.6 | 95.0 |
| 5 | Al$_2$O$_3$-K$_2$MoO$_4$ (10 wt. percent) | 50.3 | 46.3 | 92.0 |
| 6 | Al$_2$O$_3$-K$_2$CrO$_4$ (8 wt. percent) | 39.0 | 33.8 | 86.7 |
| 7 | Al$_2$O$_3$-Na$_2$WO$_4$ (4 wt. percent) | 88.1 | 81.7 | 92.7 |
| 8 | Al$_2$O$_3$-Na$_3$VO$_4$ (4 wt. percent) | 64.9 | 60.2 | 92.7 |
| 9 | Al$_2$O$_3$-K$_2$Mn$_2$O$_8$ (2 wt. percent) | 73.9 | 64.5 | 87.3 |
| 10 | Al$_2$O$_3$ | 67.5 | 46.1 | 68.9 |

Al$_2$O$_3$=activated alumina marketed by the Aluminum Corporation of America as "Alorco F-10."

It is seen from Table I that the selectivity of activated alumina alone is considerably enhanced when the promoted catalysts of this invention are employed. This selectivity feature of the catalyst is defined as the percent of reacted methanol which was converted into methanethiol. In addition to improving the selectively of the activated alumina, it is also seen that several catalysts of this invention effectively serve to increase substantially the yield of methanethiol obtained over that resulting from use of activated alumina per se.

The instant invention is also directed to the preparation of the higher molecular weight thiols as will be seen from the following examples:

The results obtained from the reaction of ethanol and hydrogen sulfide over various catalysts are given in Table II. Hydrogen sulfide and ethanol, in a mol ratio of 2.9 to 1 were reacted over activated alumina alone, and over a catalyst composed of activated alumina ocntaining 10.4 weight percent potassium tungstate. Liquid volume hourly space velocity, based on ethanol was 0.39. The results show the marked superiority of the potassium tungstate-alumina catalyst in producing high yields of ethyl mercaptan at high selectivity.

Table II

| Run No. | Catalyst | Temp., °F. | Conversion, mol percent | Yield, mol percent | Selectivity, percent | | | | |
|---|---|---|---|---|---|---|---|---|---|
| | | | | | EtSH | Et$_2$S | Et$_2$O | C$_2$H$_4$ | Other |
| 11 | Al$_2$O$_3$-K$_2$WO$_4$ | 552 | 60.1 | 55.9 | 93.0 | 2.5 | 4.3 | 0.2 | |
| 12 | Al$_2$O$_3$-K$_2$WO$_4$ | 604 | 83.4 | 68.7 | 82.4 | 6.0 | 9.3 | 2.3 | |
| 13 | Al$_2$O$_3$-K$_2$WO$_4$ | 679 | 83.1 | 66.9 | 80.5 | 4.1 | 7.5 | 7.6 | 0.3 |
| 14 | Al$_2$O$_3$-K$_2$WO$_4$ | 720 | 82.3 | 64.1 | 78.0 | 3.6 | 6.6 | 11.5 | 0.3 |
| 15 | Al$_2$O$_3$ | 601 | 93.0 | 42.6 | 45.8 | 1.7 | 13.5 | 38.8 | 0.2 |

Al$_2$O$_3$=activated alumina marketed by the Aluminum Corporation of America as "Alorco F-10."

The results obtained from the reaction of hydrogen sulfide and 1-octanol are given in Table III. Hydrogen sulfide and 1-octanol were charged at a mol ratio of 7.7 to 1 and at a liquid volume hourly space velocity of 0.39 over the catalysts shown.

Table III

| Run No. OM- | Catalyst | Temp., °F. | Conversion, mol percent | Yield, mol percent | Selectivity, percent | | |
|---|---|---|---|---|---|---|---|
| | | | | | C$_8$SH | Octene | Other[1] |
| 1 | Al$_2$O$_3$-K$_2$WO$_4$ | 455 | 48.0 | 47.5 | 99.0 | 1.0 | 0.0 |
| 2 | Al$_2$O$_3$-K$_2$WO$_4$ | 500 | 81.6 | 75.3 | 92.3 | 7.7 | 0.0 |
| 3 | Al$_2$O$_3$-K$_2$WO$_4$ | 548 | 100 | 91.3 | 91.3 | 8.4 | 0.3 |
| 4 | Al$_2$O$_3$-K$_2$WO$_4$ | 605 | 100 | 77.4 | 77.4 | 18.0 | 4.5 |
| 5 | Al$_2$O$_3$ | 603 | 100 | 34.3 | 34.3 | 6.7 | 59.0 |

Al$_2$O$_3$=activated alumina marketed by the Aluminum Corporation of America as "Alorco F-10."
[1] Probably octylaldehyde.

When a mixture of hydrogen sulfide and cetyl alcohol is reacted at a mol ratio of 3 to 1 at 500° F. over an activated alumina catalyst, about 90 percent of the alcohol is converted and a yield of 52 mol percent, based on the alcohol charged, is obtained. With a catalyst composed of activated alumina containing 10.4 weight percent potassium tungstate, the mercaptan yield is 62 mol percent at an overall conversion of around 90 percent. Under the same operating conditions, a catalyst composed of 10 percent calcium tungstate and 90 percent activated alumina produces a yield of 58 percent cetyl mercaptan and about 88 percent of the alcohol is converted.

The catalyst of this invention may be prepared by any of the techniques which are conventionally employed in catalyst manufacture. A uniform distribution of the metallic salt promoter throughout the alumina may be effected by permeating or impregnating alumina with a suitable salt solution, the coprecipitation method which involves precipitation from a mixture of metallic salts may be employed where appropriate, or the catalyst may be prepared by admixing component compounds or precipitated components of the composite catalyst and processing in a suitable manner. The amount of metallic salt which may be added to the alumina to enhance its catalytic properties may be between about 0.5% by weight to 15% by weight and preferably between about 2% by weight, although in some instances amounts outside these ranges may be desirable. In the appended claims the promoter employed is described as being contained in the alumina component of the catalyst. By this it is meant that the activity promoting reagent is incorporated in the catalyst composition by any of the conventional catalyst preparation techniques, such as those suggested above, wherein an activity promoting reagent is introduced into the catalyst composition.

The activated aluminas which may be employed in a major proportion in the composite catalyst are those types of sorptive aluminum oxides which in general have surface areas in excess of around 10 square meters per gram. Activated alumina resulting from either naturally occurring materials such as bauxites or those prepared synthetically may be used. A common variety is prepared by controlled calcination of a rock-like form of alpha alumina trihydrate. This type is exemplified by Alcoa Activated Alumina Grade F. A second variety typified by Alcoa Activated Alumina Grade H is composed of translucent granules prepared from a gelatinous alumina which has a high surface area even before any decomposition of the alumina hydrate is effected. A third type of sorptive alumina comprises discrete particles of such small size that they have appreciable area on their outer geometric surface. Examples of this type are Alcoa Activated Alumina R–2396 and Alcoa Activated Alumina XF–21. Activated aluminas resulting from other well known methods of preparation may be employed also. The size and shape of the catalyst will be determined by how the catalyst is to be employed. Desired physical forms may be obtained by adding the promoter to a granular, pelleted or fluid type activated alumina, or by processing the finished catalyst to obtain the required shape and size. The subject invention may be carried out in a static or moving bed type of reactor employing granular or pelleted catalysts. However, a fluidized system may also be used and in this instance a finely comminuted catalyst must be used.

In the use of the catalyst of the present invention for the production of thiols, the reaction between hydrogen sulfide and the alcohol employed may be carried out, as pointed out above, in either a fixed bed process or in a process in which the catalyst moves through the reaction zone. In employing the fixed bed type of reaction, temperatures in the order of 300°–930° F. may be employed. Generally optimum temperatures will be lower when higher molecular weight alcohols are used as reactants. In the reaction of methanol and hydrogen sulfide to produce methanethiol, temperatures in the range of 575°–930° F. are preferred. With higher alcohols such as octanol, preferred temperatures are in the range of 400°–750° F. Pressures may vary widely. Superatmospheric pressures up to about 200 pounds per square inch gauge are preferably used although higher pressures may be employed. However, the reaction also may be carried out at subatmospheric or atmospheric pressures. The mol ratio of the reactants may range from about 0.5 to about 10 mols of hydrogen sulfide to 1 mol of alcohol. Although it is generally preferred to maintain an excess of hydrogen sulfide in the reactant mixture it may be desirable to employ substantially stoichiometric proportions in order to avoid unnecessary complications that may occur, for example, in the recovery system. Throughput rates will vary with the temperatures and will in general be from about 0.1 to about 5 volumes of alcohol per volume of catalyst per hour. This variable is also known as the above defined liquid volume hourly space velocity.

The foregoing examples are only illustrative of the application of this invention to the preparation of thiols. Alcohols which may be used in carrying out this invention are those monohydric alcohols having from 1–16 carbon atoms per molecule. Such alcohols include the primary, secondary and tertiary aliphatic alcohols. Specific examples include methanol, ethanol, butanol-1, butanol-2, tert-octyl alcohol, etc. Mixtures of alcohols, such as "Lorol" containing alcohols of 10–16 carbon atoms, may be used also. Also applicable in the instant invention are the aryl derivatives of carbinol having not more than 16 carbon atoms per molecule, such as phenyl, benzyl, tolyl, xylyl, mono-, di-, and tri-methyl phenyl carbinols, phenyl propyl alcohol, etc.

The recovery of the organic thiols from the reactor effluent may be effected by various alternatives which may be adapted to local conditions or changing economics. One method of separation involves fractional condensation and stabilization of the physical principles of adsorption may be employed to recover the methanethiol from the reactor effluent. Several variations in recovery techniques are described in copending patent application Serial No. 431,230, filed May 20, 1954, which relates to a continuous method for the production and recovery of methanethiol produced in a manner similar to the instant invention. In the production of the higher molecular weight thiols some changes in the recovery system as determined by the nature of the products will be necessary. For example, in the preparation of the lower molecular weight thiols, the reaction product upon condensation is an admixture normally gaseous and normally liquid products. Obviously the recovery system will have to be designed to handle this heterogeneous mixture. However, the treatment of the products of the reaction from the higher molecular weight alcohols and hydrogen sulfide is somewhat simpler. In this instance the products are mainly liquids with very low vapor pressure and entrainment with the residual hydrogen sulfide is the only factor of importance. Consequently, the reaction product can be processed in a stripper which removes the excess hydrogen sulfide for recycling. Further stripping of volatile impurities, if necessary, may be carried out in a low pressure stripper. The crude product then is passed to a thiol fractionating unit. The thiols are withdrawn from the mercaptan tower and pass to storage. These techniques, of course, are only illustrative as other processing expedients for the recovery of the thiol product from the reaction effluent will be apparent to those skilled in the art.

The catalysts which are described by this invention, in addition to producing increased yields of organic thiols by means of enhanced conversion and selectivity, also have other important characteristics. These catalysts are more economical to produce, are less susceptible to attrition, have a longer life, and are not as readily deactivated by increased operating temperatures as the preferred thoria catalyst described in the prior art. These properties permit the catalyst to be readily employed in a fluidized operation for the production of methanethiol from the reaction of an alcohol and hydrogen sulfide.

It is to be understood that the foregoing examples of this invention are only illustrative. Other modifications of the manipulative technique employed in carrying out this invention will be apparent to those who are skilled in the art and are accordingly within the scope of the invention as defined in the appended claims.

We claim:

1. In a method for producing organic thiols by the reaction between hydrogen sulfide and a $C_1$–$C_{16}$ monohydric alcohols, selected from the group consisting of alkanols monocyclic aryl-substituted alkanols, and monocyclic aralkyl-substituted alkanols, at a temperature within the range of 300–930° F. and at a suitable mol ratio of hydrogen sulfide to alcohol to effect the product of said thiol as the principal product of said reaction, the improvement which comprises conducting said reaction in the presence of activated alumina catalyst containing as an activity-promoting agent 1.5% to 15% by weight, based on the catalyst composition, of at least one alkali metal salt of an oxy-acid of a metal selected from the group consisting of tungsten, chromium, molybdenum, uranium, vanadium, and manganese.

2. In a method for producing organic thiols by the reaction between hydrogen sulfide and a $C_1$–$C_{16}$ monohydric alcohol, selected from the group consisting of alkanols, monocyclic aryl-substituted alkanols and monocyclic aralkyl-substituted alkanols, at a temperature within the range of 300–930° F., a mol ratio of hydrogen sulfide:alcohol of about 0.5–10:1 and a liquid volume hourly space velocity (based on alcohol) of about 0.1–5, the improvement which comprises conducting said reaction in the presence of activated alumina catalyst containing as an activity-promoting agent 1.5% to 15% by weight, based on the catalyst composition, of at least one alkali metal salt of an oxy-acid of a metal selected from the group consisting of tungsten, chromium, molybdenum, uranium, vanadium, and manganese.

3. A method in accordance with claim 2 in which the alkali metal salt is the salt of an oxy-acid of tungsten.

4. A method in accordance with claim 3 in which the alkali metal salt is potassium tungstate.

5. A method in accordance with claim 3 in which the alkali metal salt is sodium tungstate.

6. A method in accordance with claim 2 in which the alkali metal salt is the salt of an oxy-acid of molybdenum.

7. A method in accordance with claim 2 in which the alkali metal salt is the salt of an oxy-acid of vanadium.

8. A method in accordance with claim 2 in which the alkali metal salt is the salt of an oxy-acid of manganese.

9. A method in accordance with claim 2 in which the alcohol is an alkanol.

10. In a method for producing organic thiols by the reaction between hydrogen sulfide and an alkanol having 1–16 carbon atoms per molecule, at a temperature within the range of about 300–930° F., a mol ratio of hydrogen sulfide:alcohol of about 1–10:1, and a liquid volume hourly space velocity (based on alcohol) of about 0.1–5, the improvement which comprises conducting said reaction in the presence of an activated alumina catalyst containing as an activity-promoting agent, 1–15% of an alkali metal salt of an oxy-acid of tungsten.

11. A method in accordance with claim 10 in which the alkali metal salt is potassium tungstate.

12. A method for producing methanethiol by reacting hydrogen sulfide and methanol at a temperature within the range of about 575–930° F. and a mol ratio of hydrogen sulfide:methanol of about 1–10:1, in the presence of an activated alumina catalyst containing as an activity-promoting agent, about 0.5 to 15% by weight, based on the catalyst composition, of at least one alkali metal salt of an oxy-acid of a metal selected from the group consisting of tungsten, chromium, molybdenum, uranium, vanadium and manganese.

13. A method in accordance with claim 12 in which the alkali metal salt is a metallic salt of an oxy-acid of tungsten.

14. A method in accordance with claim 13 in which the alkali metal salt is potassium tungstate.

15. A method in accordance with claim 13 in which the alkali metal salt is sodium tungstate.

References Cited in the file of this patent

UNITED STATES PATENTS

| | | |
|---|---|---|
| 2,116,182 | Baur | May 3, 1938 |
| 2,217,013 | Groose et al. | Oct. 8, 1940 |
| 2,514,300 | Laughlin | July 4, 1950 |
| 2,632,739 | Dinwiddie et al. | Mar. 24, 1953 |
| 2,648,639 | Bennett | Aug. 11, 1953 |

OTHER REFERENCES

Schulze et al.: Ind. and Eng. Chem., vol. 40, No. 12, pages 2308–11 (1948).